M. G. CUNNINGHAM.
TENT.
APPLICATION FILED APR. 21, 1920.

1,411,711.

Patented Apr. 4, 1922.
3 SHEETS—SHEET 1.

INVENTOR
M. G. Cunningham
BY
ATTORNEY

M. G. CUNNINGHAM.
TENT.
APPLICATION FILED APR. 21, 1920.
1,411,711.
Patented Apr. 4, 1922.
3 SHEETS—SHEET 2.
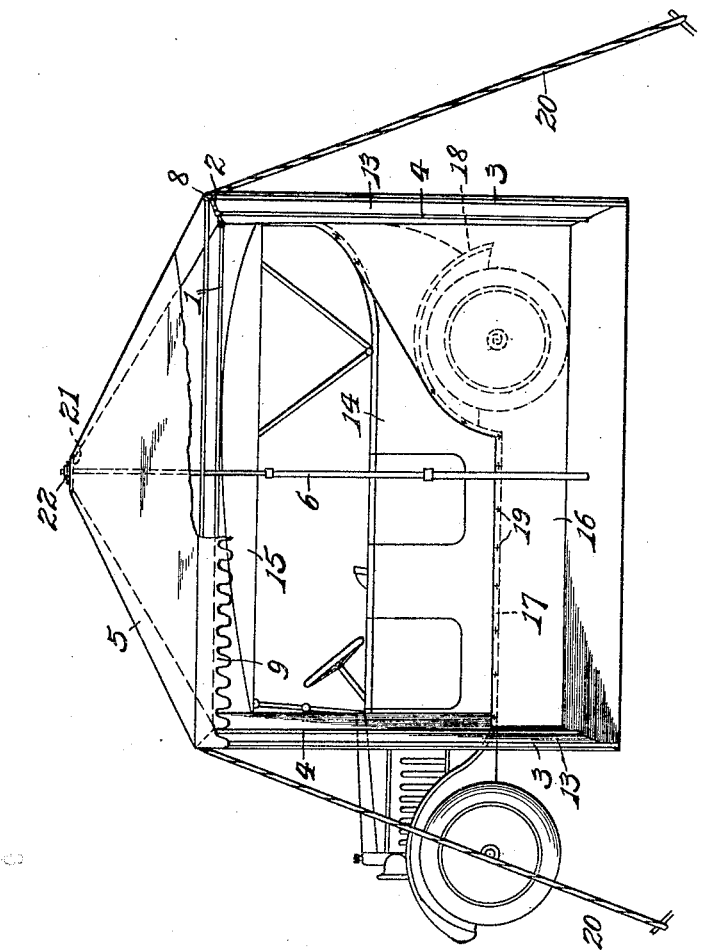
INVENTOR
M. G. Cunningham.
BY
ATTORNEY

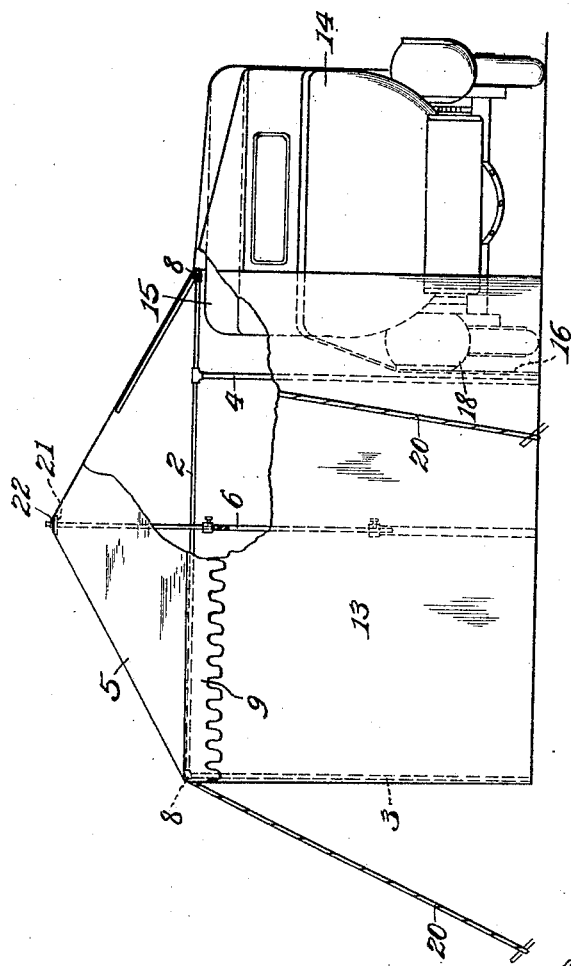

UNITED STATES PATENT OFFICE.

MARTIN G. CUNNINGHAM, OF WHEELING, WEST VIRGINIA.

TENT.

1,411,711.    Specification of Letters Patent.    Patented Apr. 4, 1922.

Application filed April 21, 1920. Serial No. 375,529.

*To all whom it may concern:*

Be it known that I, MARTIN G. CUNNINGHAM, a citizen of the United States of America, and resident of Wheeling, county of Ohio, and State of West Virginia, have invented certain new and useful Improvements in Tents, of which the following is a specification.

This invention relates broadly to tents, and more particularly to a camping outfit for automobile tourists.

The primary object of the invention is to provide a simple and convenient form of tent structure designed for association with an automobile and adapted for the accommodation of camping motorists or tourists.

A further object is to provide a camping outfit of the character mentioned which may be readily disassembled and folded into small and compact form for convenient transportation and which may be set up and taken down with a minimum of effort.

A still further object is to provide a tent which is designed to be used in conjunction with an automobile, which is so constructed that the automobile may be removed and replaced with respect thereto without derangement thereof, and which, when the automobile is removed, constitutes a complete housing or enclosure.

With these and other objects in view, the invention resides in the features of construction, arrangement of parts and combinations of elements which will hereinafter be fully described, reference being had to the accompanying drawings, in which—

Figure 2 is a front view of the same in linear perspective with the front curtains removed;

Figure 3 is a rear view of an automobile with the tent in its proper position relative thereto;

Figure 4 is an enlarged detail section of the means for attaching the canopy to the center pole; and Figure 5 is an enlarged transverse section through one of the eaves of the tent.

Figure 1:
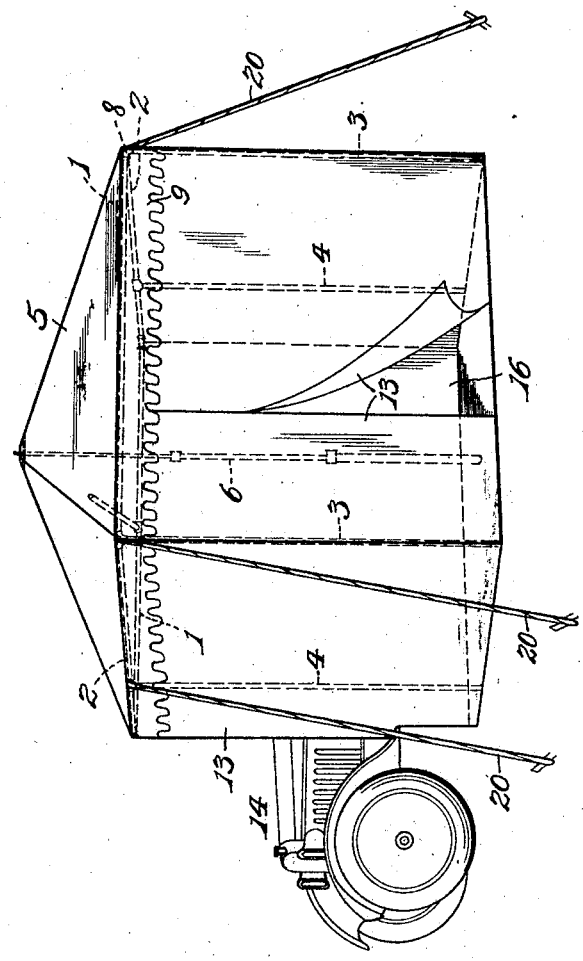
Figure 1 is a perspective view of the tent showing the position of the same with respect to the associated automobile.

Referring to said drawings, 1 indicates the sides and 2 the ends of a rectangular frame, preferably composed of gas pipe. Said frame is supported by upright posts 3 and 4, the posts 3 being attached to said frame at the front corners of the latter, while the posts 4 are attached to the end members 2 of the frame at a spaced distance from the rear corners of the latter.

Mounted upon the frame constituted, as aforesaid, by the side and end members 1 and 2 are the lateral edge portions of a canvas canopy 5 of pyramidal form which is supported at its apex by a center pole 6 which is preferably composed of telescoping pipe sections, as shown. Said edge portions of the canopy are formed with longitudinally extending pockets 7 designed for the reception of said frame members, which latter are detachable each from the others, threaded elbow couplings 8 being provided for connecting said members. As herein shown, said pockets 7 are formed at a spaced distance inward with respect to the edges of the canopy and on the under side of the latter to provide for the formation of a drop border 9 which is an integral part of said canopy, the main purpose of this construction being to avoid the provision of the seam which would be required were the drop border composed of a separate piece of material. Each of said pockets is formed by sewing to the canopy the opposite lateral edges of a canvas strip 10, one row of stitching serving to attach the upper edge portion of said strip to the canopy proper and another row to attach the lower edge portion of the strip to the drop border, as shown in Fig. 5.

Attached to the canopy, or to each of the pocket-forming strips 10 thereof, is the upper edge portion of a longitudinally extending canvas strip 11 which constitutes a curtain support and which has less depth than that of the drop border 9. Each of the curtain-supporting strips 11 carries a series or row of attaching buttons 12, or equivalent devices, by means of which are removably attached the upper edges of curtains 13 whereby a room-like enclosure is constituted.

As is most clearly shown in Fig. 3, and as hereinbefore indicated, the frame constituted by the side and end members 1 and 2 projects rearward a considerable distance beyond the positions of the supporting posts 4. The purpose of this arrangement is to make provision for disposing an automobile 14 across the rear side of the tent with its top directly underlying the rearmost of the side members 1, the elevation of the frame being preferably such that it will just clear the top 15 of the automobile.

When an automobile occupies the position indicated, it serves to substantially close the rear side of the tent and may be utilized as a part of the enclosure, it being only necessary to close the curtains of the automobile at the side opposite the tent to effectually shut in the interior of the car. A curtain 16 shaped to substantially conform to the space beneath the inner running board 17 and rear fender 18 and suitably attached, as by buttons 19, in pendent relation to said parts serves to complete the enclosure. When the car is positioned as indicated, the tent curtain 13 located on the rear side of the tent may be thrown across the top of the car, as shown in Fig. 3.

As is apparent, when it is desired to remove the car without disturbing the tent, the rear curtain 13 is thrown back off the top of the car and the curtain 16 is detached, whereupon the car may be driven away and said curtain dropped to close the rear side of the tent. Obviously, the work of removing and of replacing the car as occasion requires involves but slight effort and a minimum expenditure of time.

A suitable arrangement of guy ropes 20 maintains the tent in position.

The center pole 6 has its upper end threaded and carries a flat plate 21 at the base of the threaded portion. Said plate constitutes a support upon which the apex portion of the canopy 5 rests, said portion being penetrated by said threaded end of the pole. For securing said canopy in place with respect to said pole in such manner as to guard against undue wear thereof, a cap 22 having a flat under face is screwed upon said threaded end into binding relation to the portion of the canopy which rests upon said plate 21, as is most clearly shown in Fig. 4.

What is claimed is—

1. A tent structure for association with an automobile, comprising a rectangular frame composed of detachably connected side and end members, posts disposed in supporting relation to said frame, a canopy of pyramidal form having its edge portions attached to said frame, a center pole in supporting relation to the center of said canopy, and pendent curtains suspended from said frame and forming an enclosure, the supporting posts at the rear side of the frame being attached to the end members at a considerable distance from the rear side member to permit an automobile to occupy a lengthwise position partially underlying the latter when the curtain at the rear side is elevated.

2. A tent structure for association with an automobile, comprising a rectangular frame, supporting posts at the two front corners of said frame, supporting posts for said frame disposed at a spaced distance forward of the rear corners thereof so that an automobile may occupy a lengthwise position partially underlying the rear portion of said frame, a canopy disposed over said frame, and curtains attached to each side and end of said frame, the curtain attached to the rear end of said frame being designed to be disposed either over the top of an underlying automobile which closes the rear end of the tent or in vertical closing relation to said end when the automobile is absent.

3. A tent structure for association with an automobile, comprising a rectangular frame, supporting posts at the two front corners of said frame, supporting posts for said frame disposed at a spaced distance forward of the rear corners thereof so that an automobile may occupy a lengthwise position partially underlying the rear portion of said frame, a canopy disposed over said frame, curtains attached to each side and end of said frame, the curtain attached to the rear end of said frame being designed to be disposed either over the top of an underlying automobile which closes the rear end of the tent or in vertical closing relation to said end when the automobile is absent, and a curtain adapted to be fastened to the running board and rear fender of such automobile for more effectively closing the rear end of said tent.

4. A tent structure for association with an automobile, comprising a rectangular frame composed of detachably connected side and end members, posts disposed in supporting relation to said frame, a canopy of pyramidal form having its edge portions attached to said frame, said edge portions having longitudinal pockets formed therein for the reception of said members, said pockets being located inward with respect to the lateral edges of said canopy so as to provide a drop border and being formed by attaching to the underside of the canopy the opposite lateral edges of horizontally extending strips of fabric, pendent curtains forming the side and end walls of an enclosure, supports for said curtains located inward with respect to the drop border, said curtain supports comprising strips of fabric which have their upper edges attached to said canopy adjacent to said pockets, and which are of less depth than said drop border, and means carried by said curtain supports for detachably connecting said curtains to the latter.

5. A tent structure for association with an automobile, comprising a horizontally disposed frame, supports for said frame, said supports being of such height and disposed in such manner that an automobile may be placed in a position underlying a portion of said frame, a canopy surmounting said frame, and pendent curtains supported by the exposed sides of said frame so that said curtains and said automobile constitute a complete enclosure.

6. A tent structure for association with an automobile, comprising a rectangular frame composed of detachably connected side and end members, posts disposed in supporting relation to said frame at the front corners thereof, posts disposed in supporting relation to the side members of said frame forward of the rear corners thereof, a canopy of pyramidal form having its edge portions attached to said frame, said edge portions having longitudinal pockets formed therein for the reception of said members, said pockets being located inward with respect to the lateral edges of said canopy so as to provide a drop border and being formed by attaching to the under side of said canopy the opposite lateral edges of horizontally extending strips of fabric, a telescopic center pole supporting said canopy, pendent curtains forming the side and end walls of an enclosure, supports for said curtains located inward with respect to the drop border, said curtain supports comprising strips of fabric which have their upper edges attached to said canopy adjacent to said pockets and which are of less depth than said drop border, means carried by said curtain supports for detachably connecting said curtains to the latter, the rear end of the tent being closable by the introduction of an automobile in a position closely adjacent to the side-supporting posts and partially underlying the rear end of said frame, and a curtain designed to have its upper edge attached to the running board and rear fender of said automobile for more effectively closing the rear end of said tent when said automobile is in position.

In testimony whereof, I affix my signature in presence of two subscribing witnesses.

MARTIN G. CUNNINGHAM.

Witnesses:
C. A. FIERO,
H. E. DUNLAP.